United States Patent
Beauregard

(10) Patent No.: US 10,814,901 B2
(45) Date of Patent: Oct. 27, 2020

(54) DRIVER STATION WITH MODULE COMPRISING AN ELECTRONIC COMMUNICATION INTERFACE ELEMENT AND ASSOCIATED VEHICLE

(71) Applicant: Faurecia Interieur Industrie, Nanterre (FR)

(72) Inventor: Julien Beauregard, Mesnil en Thelle (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 92 days.

(21) Appl. No.: 16/125,323

(22) Filed: Sep. 7, 2018

(65) Prior Publication Data

US 2019/0077437 A1 Mar. 14, 2019

(30) Foreign Application Priority Data

Sep. 8, 2017 (FR) ...................... 17 58306

(51) Int. Cl.
*B62D 1/183* (2006.01)
*B60R 11/02* (2006.01)
*G05D 1/00* (2006.01)
*B62D 1/181* (2006.01)
*B60K 35/00* (2006.01)
(Continued)

(52) U.S. Cl.
CPC .............. *B62D 1/183* (2013.01); *B60K 35/00* (2013.01); *B60K 37/00* (2013.01); *B60K 37/06* (2013.01); *B60R 11/0252* (2013.01); *B62D 1/10* (2013.01); *B62D 1/181* (2013.01); *G05D 1/0088* (2013.01); *B60K 2370/1438* (2019.05); *B60K 2370/175* (2019.05); *B60K 2370/195* (2019.05); *B60K 2370/197* (2019.05); *B60K 2370/67* (2019.05);
(Continued)

(58) Field of Classification Search
None
See application file for complete search history.

(56) References Cited

U.S. PATENT DOCUMENTS 9,159,221 B1 * 10/2015 Stantchev ................ B62D 1/06
10,059,204 B2 * 8/2018 Intini ..................... G06F 3/0362
(Continued)

FOREIGN PATENT DOCUMENTS

CN 104691450 A * 6/2015 ............. B60K 37/06
DE 19824420 A1 12/1999
(Continued)

OTHER PUBLICATIONS

French Search Report on French application No. FR 1758306, dated May 7, 2018, 2 pages.

*Primary Examiner* — Shelley Chen

(74) *Attorney, Agent, or Firm* — Reising Ethington P.C.

(57) ABSTRACT

A driver station of a vehicle including a support structure and a module that has a central part, a steering wheel and an electronic communication interface element. The central part is connected to the support structure. The steering wheel and the electronic communication interface element are arranged on either side of the central part along a main direction. The module is able to be moved relative to the support structure between a first position, in which the steering wheel is provided to be across from a driver, and a second position, in which the electronic communication interface element is provided to be across from the driver.

11 Claims, 3 Drawing Sheets

(51) Int. Cl.
  *B60K 37/00*   (2006.01)
  *B60K 37/06*   (2006.01)
  *B62D 1/10*    (2006.01)
  *B60R 11/00*   (2006.01)

(52) U.S. Cl.
  CPC .. *B60K 2370/736* (2019.05); *B60K 2370/782* (2019.05); *B60R 2011/001* (2013.01)

(56) References Cited

U.S. PATENT DOCUMENTS

| | | | |
|---|---|---|---|
| 2003/0078714 A1* | 4/2003 | Kitano | B60R 11/0252 |
| | | | 701/41 |
| 2010/0250071 A1* | 9/2010 | Pala | B60K 35/00 |
| | | | 701/48 |
| 2015/0066245 A1* | 3/2015 | Lee | B62D 1/046 |
| | | | 701/2 |
| 2016/0107678 A1* | 4/2016 | Fischer | B60W 30/18063 |
| | | | 701/41 |
| 2017/0212633 A1* | 7/2017 | You | G06F 3/0412 |
| 2018/0029501 A1 | 2/2018 | Wolf | |

FOREIGN PATENT DOCUMENTS

| | | | | |
|---|---|---|---|---|
| DE | 10248487 A1 | 5/2003 | | |
| DE | 10325850 A1 | 12/2004 | | |
| DE | 102015206501 A1 | 10/2016 | | |
| EP | 1577191 A2 * | 9/2005 | ......... | B60R 11/0264 |
| FR | 2779695 A1 | 6/1998 | | |
| FR | 3047959 A1 * | 8/2017 | ............. | B62D 1/046 |
| JP | 2018144582 A * | 9/2018 | ......... | G06F 3/03547 |

\* cited by examiner

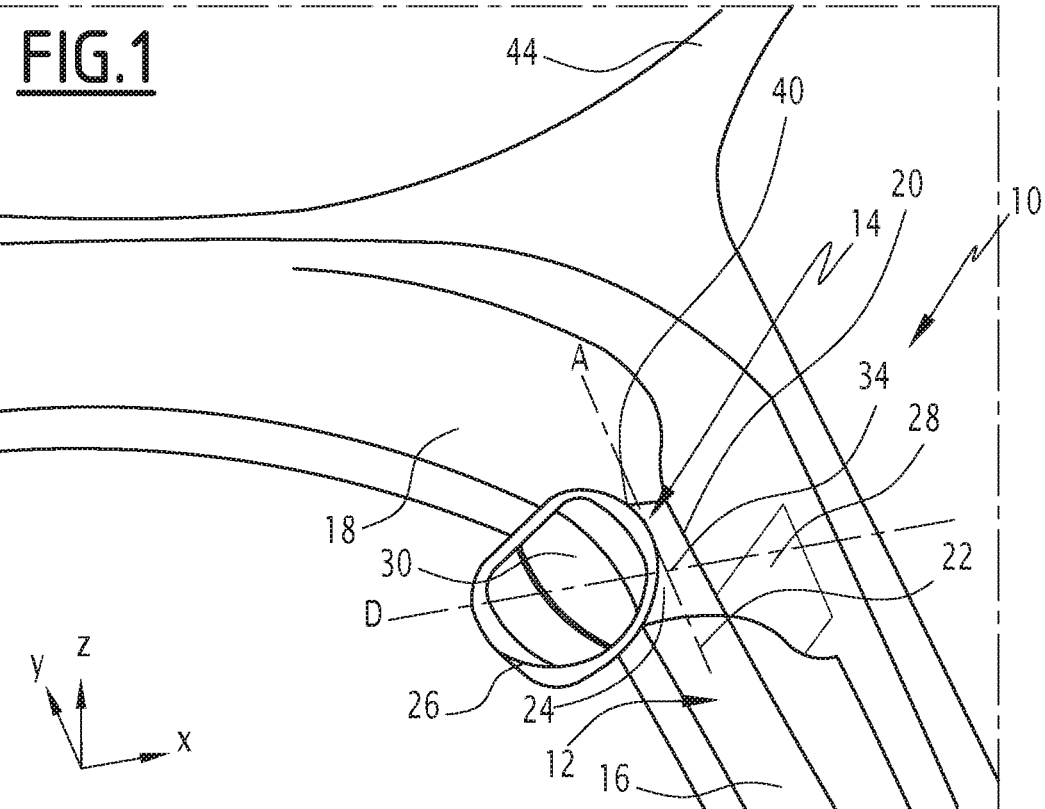
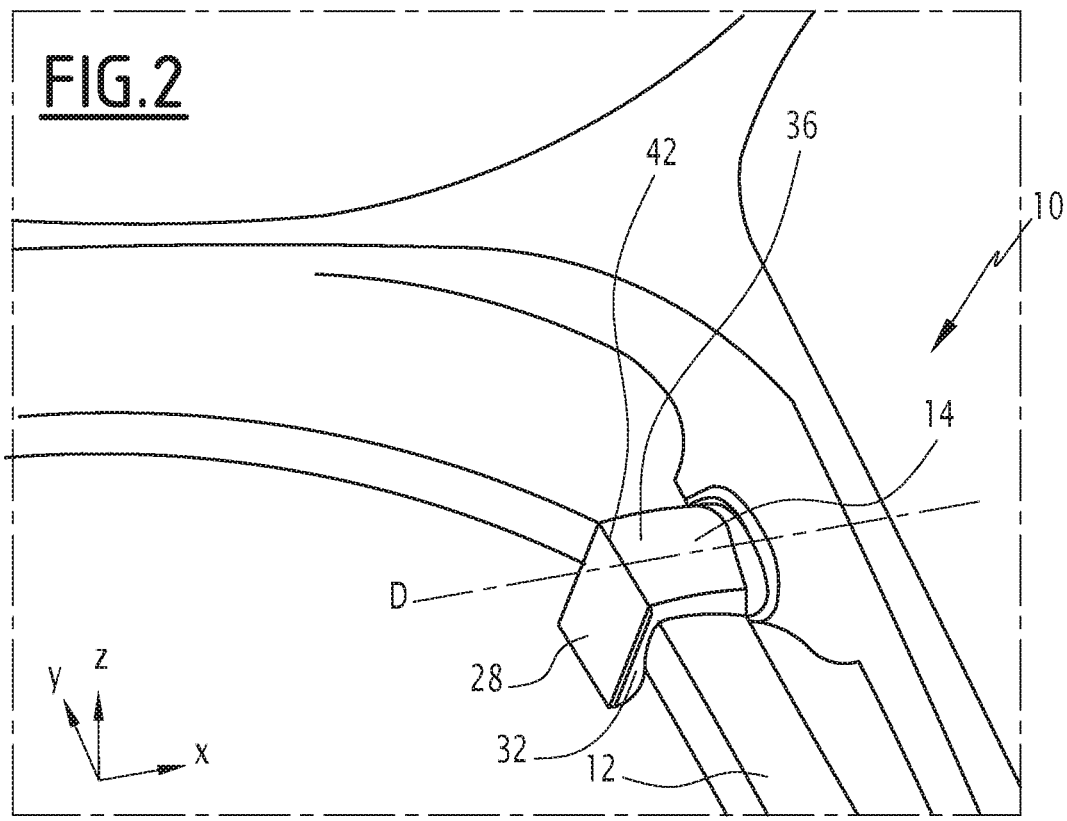

DRIVER STATION WITH MODULE COMPRISING AN ELECTRONIC COMMUNICATION INTERFACE ELEMENT AND ASSOCIATED VEHICLE

FIELD OF THE INVENTION

The present invention relates to a driver station of a vehicle including a support structure and a module. The module includes a steering wheel.

BACKGROUND

In the context of so-called "autonomous" vehicles, in which driver intervention is reduced, or even practically nonexistent, to drive the vehicle, the arrangement of the passenger compartment may be configurable by modifying the orientation and/or the position of the seats, since they no longer necessarily need to face the road.

Such vehicles are generally configurable in a manual driving configuration, in which a driver can drive the vehicle using a steering wheel, and an automatic driving configuration, in which the driver does not intervene and therefore does not use the steering wheel.

It may therefore be advantageous to provide a steering wheel that is also configurable so that the steering wheel is easily accessible in the manual driving configuration and so as to free space in front of the driver in the automatic driving configuration when the steering wheel is not used.

Document FR 2,779,695 describes a steering wheel capable of being partially folded down into a retracted position. This in particular makes it possible to provide a computer behind the steering wheel and capable of being opened behind the steering wheel when the steering wheel is retracted.

However, in the retracted position, the freed space is not optimized in the front-back direction of the vehicle. Indeed, the steering wheel occupies a space behind the computer. Thus, the computer is too far forward relative to an ergonomic position for the driver.

SUMMARY

One aim of the invention is to offset these drawbacks by proposing a driver station including a first position suitable for driving and a second position, each of these positions being ergonomic for the driver.

To that end, the invention relates to a driver station of the aforementioned type in which the module includes a central part, a steering wheel and an electronic communication interface element, the central part being connected to the support structure, the steering wheel and the electronic communication interface element being arranged on either side of the central part along a main direction, the module being able to be moved relative to the support structure between a first position, in which the steering wheel is provided to be across from the driver, and a second position, in which the electronic communication interface element is provided to be across from the driver.

In the driver station according to at least some embodiments of the invention, the electronic communication interface element is not added to the steering wheel in the second position. Thus, it is possible to provide dimensions such that, in the first position, the steering wheel is in the ergonomic location and, in the second position, the electronic communication interface element is then in the ergonomic location.

The dimensions in particular depend on the vehicle in which the driver station is intended to be arranged.

According to other aspects of the invention, the driver station may have any of the following features considered alone or according to any technically possible combination:
- the movement of the module relative to the support structure between the first position and the second position is done by rotation around a rotation direction,
- the rotation direction is substantially perpendicular to the main direction and/or an elevation direction substantially perpendicular to a rolling plane of the vehicle,
- the electronic communication interface element is a screen, more particularly a touch-sensitive screen,
- the electronic communication interface element is connected to the central part by a hinge, more particularly a pivot axis substantially perpendicular to the main direction,
- the movement of the electronic communication interface element relative to the central part by the hinge is able to be controlled by the driver, in particular via the electronic communication interface element,
- in the first position and/or the second position, the central part forms a continuous upper surface with the support structure,
- the movement of the module between the first position and the second position is able to be controlled via the driver station, and
- the first position of the module corresponds to a first driving mode of the vehicle and the second position of the module corresponds to a second driving mode of the vehicle different from the first driving mode.

The invention also relates to a vehicle including a driver station of the aforementioned type.

BRIEF DESCRIPTION OF THE DRAWINGS

Other aspects and advantages of the invention will appear upon reading the following description, provided as an example, and done in reference to the appended drawings, in which:

FIG. 1 is a perspective view of a driver station according to a first embodiment of the invention, the module being in the first position, FIG. 2 is a perspective view of the driver station of FIG. 1, the module being in the second position.

DETAILED DESCRIPTION

Figure 3:
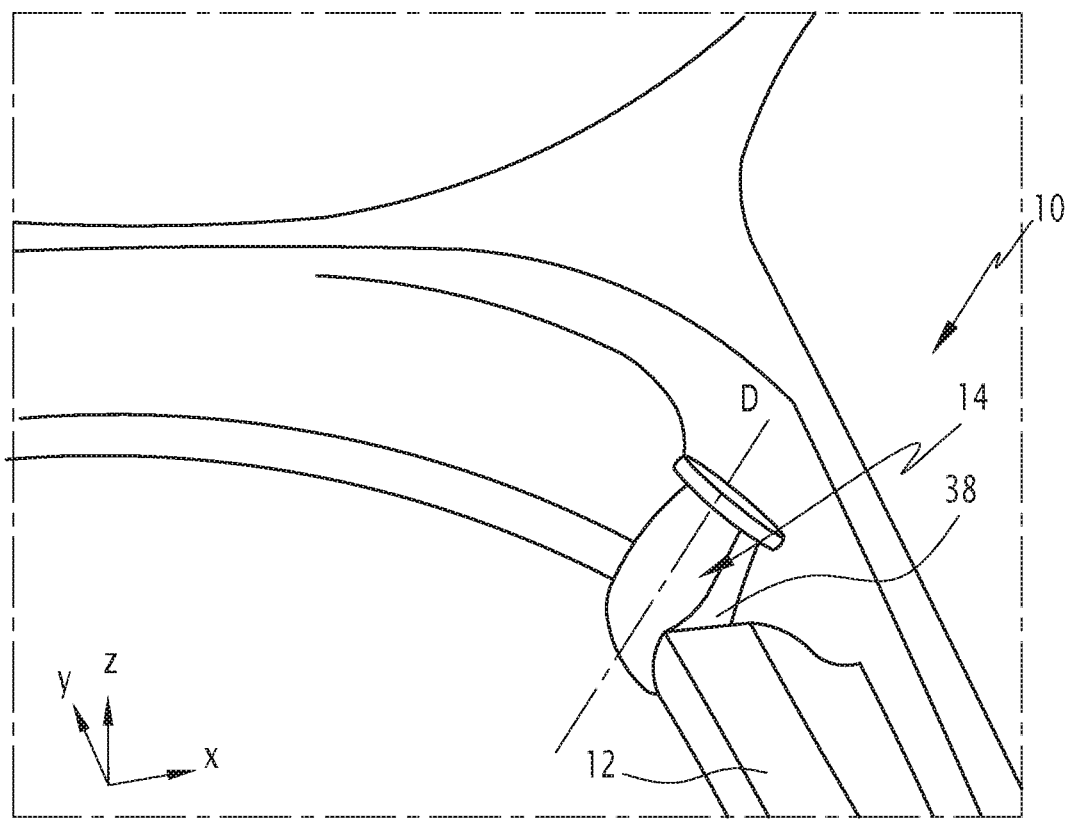
FIG. 3 is a perspective view of the driver station of FIG. 1, the module being moved between the first position and the second position.

FIGS. 1 to 3 show a driver station 10 of a vehicle, in particular a so-called "autonomous" vehicle.

A longitudinal direction X is defined as the normal movement direction of the vehicle, an elevation direction Z as the direction perpendicular to the ground on which the vehicle moves, and a transverse direction Y perpendicular to the longitudinal X and elevation Z directions.

The terms "right", "left", "back", "front", "upper" and "lower" are defined along the usual direction for a vehicle.

The driver station 10 includes a support structure 12 and a module 14.

The support structure 12 is for example a dashboard.

The support structure 12 here extends along the transverse direction Y.

More particularly, the support structure 12 includes a right part 16 and a left part 18.

An empty space 20 is defined by the support structure 12, more particularly between the right part 16 and the left part 18.

The space 20 is provided in front of the driver along the longitudinal direction X.

The support structure 12 has an upper surface 22. The upper surface 22 is discontinuous, more particularly between the right part 16 and the left part 18.

The module 14 includes a central part 24, a steering wheel 26 and an electronic communication interface element 28.

The module 14 does not extend above or below the support structure 12 along the elevation direction Z.

The steering wheel 26 and the electronic communication interface element 28 are arranged on either side of the central part 24 along a main direction D. The steering wheel 26 is located on a first side of the central part 24 and the electronic communication interface element 28 on a second side of the central part 24, the second side of the central part 24 being opposite the first side along the main direction D.

The steering wheel 26 and the electronic communication interface element 28 are connected to the central part 24.

The central part 24 is connected to the support structure 12.

The central part 24 has a shape complementary to the support structure 12 and extends at least partially in the space 20.

The central part 24 is delimited toward the steering wheel 26 by a steering wheel surface 30, toward the interface 28 by an interface surface 32, as well as by an upper steering wheel surface 34 and an upper interface surface 36.

The steering wheel surface 30 and the interface surface 32 are opposite along the main direction D.

The upper steering wheel and interface surfaces 34, 36 are substantially opposite one another.

The central part 24 further has a right surface 38 facing the right part 16 of the support structure 12 and a left surface 40 facing the left part 18 of the support structure 12.

The right surface 38 and the left surface 40 are opposite along a direction perpendicular to the main direction D and the elevation direction Z.

The right surface 38, the left surface 40, the upper steering wheel surface 34 and the upper interface surface 36 connect the steering wheel surface 30 and the interface surface 32.

The steering wheel 26 is fastened to the steering wheel surface 30 of the central part 24.

The electronic communication interface element 28 is for example a touch-sensitive screen or a screen and at least one button or any other electronic interface element.

The interface element 28 is oriented toward the outside of the module 14.

The electronic communication interface element 28 is arranged in front of the interface surface 32.

The interface element 28 here is fastened to the junction between the interface surface 32 and the upper interface surface 36.

The electronic communication interface element 28 is connected to the central part 24 by a connection 42.

The connection is for example a hinge.

The hinge has a pivot axis that is for example substantially perpendicular to the main direction D.

Figures 4, 5:
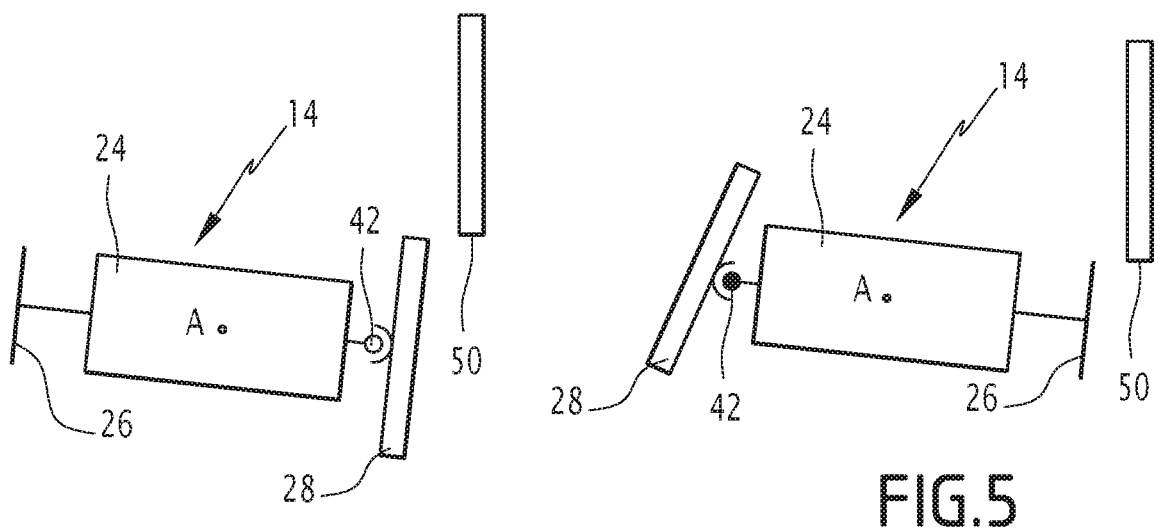
FIG. 4 is a schematic view of a driver station according to a second embodiment of the invention, the module being in the first position.
FIG. 5 is a schematic view of the driver station of FIG. 4, the module being in the second position.

Alternatively, the connection is a ball joint as shown in the alternative of FIGS. 4 and 5 or a pivot or a slide or any combination of a hinge, pivot, ball joint and/or slide connection.

The connection 42 in particular makes it possible to adjust the orientation of said interface element 28 relative to the rest of the module 24.

The movement of the electronic communication interface element 28 relative to the central part 24 by the connection 42 is able to be controlled by the driver, in particular via the electronic communication interface element 28. Alternatively or additionally, the movement of the communication interface element 28 is able to be done manually by the driver by manipulating said interface element 28.

The module 14 is able to be moved relative to the support structure 12 between a first position shown in FIG. 1 and a second position shown in FIG. 2.

The first position corresponds to a first driving mode of the vehicle. The second position corresponds to a second driving mode of the vehicle.

The movement of the module 14 between the first position and the second position is able to be controlled via the driver station 10, for example, directly via a manual or touch-sensitive button or automatically during the passage to autonomous driving.

In the first and second positions, the main direction D extends in a plane defined by the longitudinal X and elevation Z directions and has an angle smaller than 30° with the longitudinal direction X.

In the first position, the steering wheel 26 faces the driver. The driver is able to manipulate the steering wheel 26.

The first position is more particularly a driving position.

The first driving mode of the vehicle corresponds to a mode where the driver drives the vehicle. In this driving mode, the driver acts on the steering wheel to steer the vehicle.

The upper steering wheel surface 34 is then the upper surface of the module 14 along the elevation direction Z.

In the illustrated embodiment, the upper steering wheel surface 34 forms a continuous surface with the support structure 12. Thus, the central part 24 forms a continuous upper surface with the support structure 12. The upper steering wheel surface 34 fits in the extension of the upper surface 22.

In the second position, the electronic communication interface element 28 is across from the driver. The driver is able to use the electronic communication interface element 28. In the second position, the driver is able to manipulate the communication interface 28. The driver is able to interact with the communication interface, for example by touching the surface of the communication interface 28.

The driver is able to adjust the orientation of the interface element 28 using the connection 42 to have a better view of the interface element 28.

The second driving mode corresponds to an autonomous driving mode of the vehicle. In this second mode, the driver no longer needs to interact with the steering wheel and can then perform any other activity.

The second position is for example a position in which the driver may perform an activity other than driving, for example a recreational and/or professional activity. For recreation, the interface element 28 is for example able to display a video, play music or browse the Internet. For work, the interface element 28 is for example able to display an email inbox, show work documents or organize a video conference.

The second position for example includes a first mode and a second mode. The first mode corresponds to a recreational mode and the second mode corresponds to a work mode. The interface element 28 for example has a different orientation between the first mode and the second mode. Additionally, a keyboard is provided in the second mode.

The upper interface surface 36 is then the upper surface of the module 14 along the elevation direction Z.

In the illustrated embodiment, the upper interface surface 36 has a curved dome shape relative to the support structure 12.

In another embodiment that is not shown, the upper interface surface 36 forms a continuous surface with the support structure 12 in the second position. Thus, the central part 24 forms a continuous upper surface with the support structure 12. The upper interface surface 36 fits in the extension of the upper surface 12.

The movement of the module 14 relative to the support structure 12 between the first position and the second position is done here by rotation around a rotation direction A.

The rotation direction A is substantially perpendicular to the main direction D.

The rotation direction A is substantially perpendicular to the elevation direction Z.

More particularly, during the movement from the first position to the second position and vice versa, the steering wheel 26 passes above the central part 24 along the elevation direction Z, as shown in FIG. 3. Alternatively, the steering wheel 26 passes above the central part 24 along the elevation direction Z during the movements.

Thus, the movement direction from the first position to the second position is opposite the movement direction from the second position to the first position. This in particular makes it possible for cables optionally arranged in the module 14 not to twist by turning around themselves several times.

The connection between the central part 24 and the support structure 12 is for example a pivot link (not shown) around the rotation direction A.

The pivot link is located substantially in line with the median line of the support structure 12 relative to the main direction D defined when the module 14 is in the first position.

The connection 42 between the electronic communication interface element 28 and the central part 24 is substantially parallel to the rotation direction A.

The invention also relates to a vehicle, more particularly a motor vehicle, including a driver station 10 as previously described.

Such a vehicle further includes a windshield pillar 44 and an airbag arranged in the windshield pillar 44. The airbag is provided to open in front of the driver in case of accident.

This in particular makes it possible not to have an airbag in the module 14.

In the second position, the electronic communication interface element 28 is not added to the steering wheel 26, but in place of it. Thus, it is possible to arrange the driver station 10 so that the steering wheel 26 is in the ergonomic place for the driver in the first position and so that the interface element 28 is in the ergonomic place for the driver in the second position.

The pivot link for the rotational movement of the module 14 is a robust connection. This in particular makes it possible to have fewer maintenance problems, such as seizing, relative to a complex system.

Alternatively, it is possible to provide a movement other than rotation, for example combined translation and rotation, to allow ergonomic positioning of the steering wheel 26 or the interface element 28 in each position.

In one embodiment that is not shown, the steering wheel 26 is retractable. More particularly, the steering wheel is bendable so that it can be inserted in the central part 24 outside the first position. The module is thus more compact: it is not necessary to provide additional space in the layout of the vehicle for the location of the steering wheel in the second position.

In one alternative that is not shown, the support structure 12 includes two arms extending from a body element of the vehicle, for example the firewall, and supporting the module 14 on either side along the transverse direction Y. The arms more particularly extend substantially along the longitudinal direction X.

In one embodiment shown in FIGS. 4 and 5, the driver station includes an additional communication interface element 50. The additional interface element 50 is outside the module 14. The additional interface element 50 shows information useful for driving such that it is visible to a driver. The information is for example displayed on a screen or projected on a surface. The additional interface element 50 more particularly serves as an instrument panel or combo.

Figure 6:
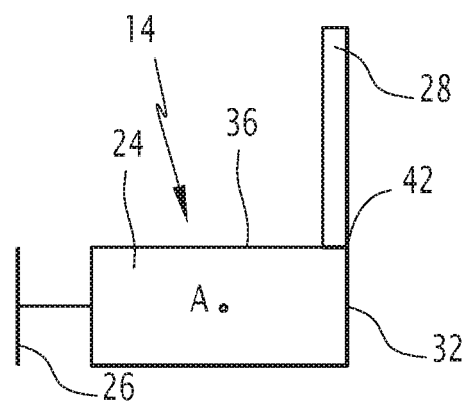
FIG. 6 is a schematic view of a driver station according to a third embodiment of the invention, the module being in the first position.
Figure 7:
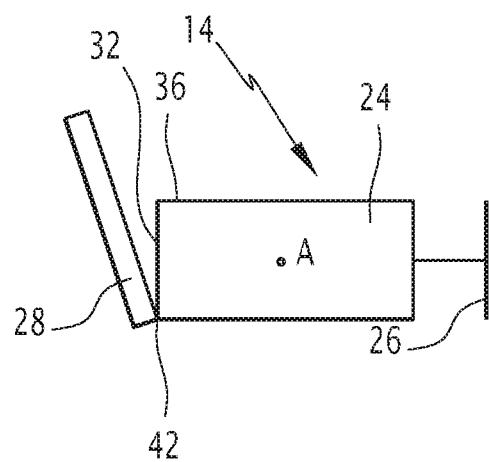
FIG. 7 is a schematic view of the driver station of FIG. 6, the module being in the second position.

In one alternative embodiment shown in FIGS. 6 and 7, the connection 42 of the interface element 28 to the central part 24 is able to allow the interface element 28 to rotate relative to the interface surface 32 by at least 180° around a rotation axis, for example substantially parallel to the rotation direction A. The rotation axis of the connection 42 is located substantially near the steering wheel upper surface 34. In the first position, the interface element 28 is pivoted by at least 130° relative to the interface surface 32 such that it extends above the central part 24 and it is visible by a driver. The interface element 28 displays information useful for driving, and for example serves as instrument panel. In the second position, the interface element 28 extends substantially in the extension of the central part 24 along the main direction D and forms an angle smaller than 30° with the interface surface 32.

The invention claimed is:

1. A driver station of a vehicle including a support structure and a module, wherein the module includes a central part, a steering wheel and an electronic communication interface element, the central part being connected to the support structure, the central part having a first side and a second side, the first side and the second side being opposite in a main direction, the steering wheel being arranged on the first side of the central part, the electronic communication interface element being arranged on the second side of the central part, the module being able to be moved relative to the support structure between a first position, in which the steering wheel is provided to be across from a driver, and a second position, in which the electronic communication interface element is provided to be across from the driver, wherein the electronic communication interface element is a touch-sensitive screen.

2. The driver station according to claim 1, wherein the movement of the module relative to the support structure between the first position and the second position is done by rotation around a rotation direction.

3. The driver station according to claim 2, wherein the rotation direction is substantially perpendicular to the main direction and/or an elevation direction substantially perpendicular to a rolling plane of the vehicle.

4. The driver station according to claim 1, wherein the electronic communication interface element is connected to the central part by a hinge.

5. The driver station according to claim 4, wherein the movement of the electronic communication interface element relative to the central part by the hinge is able to be controlled by the driver.

6. The driver station according to claim 1, wherein in the first position and/or the second position, the central part forms a continuous upper surface with the support structure.

7. The driver station according to claim 1, wherein the movement of the module between the first position and the second position is able to be controlled via the driver station.

8. The driver station according to claim 1, wherein the first position of the module corresponds to a first driving mode of the vehicle and the second position of the module corresponds to a second driving mode of the vehicle different from the first driving mode.

9. A vehicle including a driver station according to claim 1.

10. The driver station according to claim 4, wherein the electronic communication interface element is connected to the central part by a hinge having a pivot axis substantially perpendicular to the main direction.

11. The driver station according to claim 5, wherein the movement of the electronic communication interface element relative to the central part by the hinge is able to be controlled by the driver via the electronic communication interface element.

* * * * *